United States Patent
Watanabe (10) Patent No.: US 7,114,073 B2
(45) Date of Patent: Sep. 26, 2006

(54) DIGITAL CONTENTS GENERATING APPARATUS AND DIGITAL CONTENTS REPRODUCING APPARATUS

(75) Inventor: Junya Watanabe, Tokyo (JP)

(73) Assignee: Nec Corporation, Tokyo (JP)

( * ) Notice: Subject to any disclaimer, the term of this patent is extended or adjusted under 35 U.S.C. 154(b) by 828 days.

(21) Appl. No.: 09/960,424

(22) Filed: Sep. 21, 2001

(65) Prior Publication Data

US 2002/0069359 A1 Jun. 6, 2002

(30) Foreign Application Priority Data

Sep. 21, 2000 (JP) .............................. 2000-286640

(51) Int. Cl.
*H04L 9/32* (2006.01)
*G06K 9/36* (2006.01)
(52) U.S. Cl. ...................... 713/176; 380/44; 713/194; 382/250
(58) Field of Classification Search ................ 713/150, 713/168, 176, 189, 193, 194, 200; 380/200–202, 380/44, 277; 382/100, 232, 248, 250; 705/50–59
See application file for complete search history.

(56) References Cited

U.S. PATENT DOCUMENTS

| 6,070,198 | A  | * | 5/2000  | Krause et al. ............... 719/321 |
| 6,674,858 | B1 | * | 1/2004  | Kimura et al. ............... 380/202 |
| 6,700,991 | B1 | * | 3/2004  | Wu et al. .................... 382/100 |
| 6,801,999 | B1 | * | 10/2004 | Venkatesan et al. ........ 713/167 |
| 6,898,706 | B1 | * | 5/2005  | Venkatesan et al. ........ 713/167 |

FOREIGN PATENT DOCUMENTS

| JP | H9-387542   | 11/1997 |
| JP | 10-254909   | 9/1998  |
| JP | 2000-175161 | 9/1998  |
| JP | 11-88852    | 3/1999  |
| JP | H11-232779  | 8/1999  |
| JP | 11-317860   | 11/1999 |
| JP | 2000-172648 | 6/2000  |
| JP | 2000-339227 | 12/2000 |
| JP | 2002-57997  | 2/2002  |

OTHER PUBLICATIONS

Japanese Article (Nikkei Electronics, Apr. 22, 1996, No. 660, p. 13).

* cited by examiner

*Primary Examiner*—Christopher Revak
(74) *Attorney, Agent, or Firm*—Scully, Scott Murphy & Presser, P.C.

(57) ABSTRACT

A digital contents generating apparatus connected with a communication network comprises an electronic watermark-data embedding unit for embedding electronic watermark data in digital contents, an encryption unit for encrypting the digital contents embedded with electronic watermark data by an encryption key received from an encryption-key generating unit, and a decryption-key generating unit for generating a decryption key. A digital contents reproducing apparatus connected with the communication network comprises an electronic watermark data extraction unit for extracting electronic watermark data from encrypted digital contents embedded with electronic watermark data, and a decryption unit for decrypting the encrypted digital contents by a predetermined decryption key.

8 Claims, 7 Drawing Sheets

DIGITAL CONTENTS GENERATING APPARATUS AND DIGITAL CONTENTS REPRODUCING APPARATUS

BACKGROUND OF THE INVENTION

The present invention relates to a digital contents generating apparatus and a digital contents reproducing apparatus using a network. More particularly, it relates to a digital contents generating apparatus in which identification data comprising specific information, i.e., electronic watermark data, are embedded in digital contents and the digital contents are then encrypted for delivery, and to a digital contents reproducing apparatus for the reproduction of such digital contents.

An increasing amount of digital contents is being provided. This is due, for example, to the explosive increase in the number of users of the World Wide Web (WWW) on the Internet, and the spread of hardware that allows personal access to large volumes of data. With the increase in the amount of digital contents provided, illegal reproduction of digital contents is becoming a social problem. As a technique for preventing such illegal reproduction, embedding and detection of electronic watermark data is gaining attention. The embedding of electronic watermark data involves embedding ID information that is imperceptible by humans but is machine-readable directly in the data constituting the digital contents as a kind of noise. The embedded ID information is characterized in that it exists with the digital contents at all times and cannot be easily erased or modified. These characteristics are taken advantage of by the electronic watermark data embedding and detection technique for preventing illegal reproduction of digital contents.

However, the digital contents such as image data in which electronic watermark data are embedded are by no means visually inferior to the original digital contents prior to the embedding of the electronic watermark data. Therefore, those who illegally obtained a data storage medium storing the digital contents with the embedded electronic watermark data can view or listen to the digital contents.

It is also noted that with the spread of the Internet, services are becoming more and more available in which authorized owners of digital contents distribute their contents to predetermined users via the Internet.

SUMMARY OF THE INVENTION

Accordingly, it is an object of the present invention to provide a digital contents generating apparatus which can prevent illegal users from viewing and/or listening to digital contents.

It is a more specific object of the present invention to provide a digital contents generating apparatus in which electronic watermark data are embedded in digital contents when providing the digital contents via the Internet or data storage media, and in which the digital contents with the embedded electronic watermark data is encrypted for delivery.

It is another object of the invention to provide a digital contents reproducing apparatus for the reproduction of the digital contents generated by the digital contents generating apparatus.

A digital contents generating apparatus according to the present invention embeds electronic watermark data in digital contents, and encrypts the electronic watermark data-embedded digital contents by means of a predetermined encryption key. The encrypted digital contents are received by a digital contents reproducing apparatus, which then decrypts the encrypted digital contents by means of a predetermined decryption key.

The digital contents generating apparatus according to the present invention is characterized in that the digital contents with the embedded electronic watermark data are encrypted by means of a predetermined encryption key and then sent out on the Internet or stored in a data storage medium.

The digital contents reproducing apparatus according to the present invention is characterized in that it receives the encrypted digital contents with the embedded electronic watermark data from the Internet or the data storage medium, and then decrypts the digital contents by means of a predetermined decryption key while detecting the electronic watermark data from the input digital contents.

A digital contents providing system according to the present invention comprises a communication network, a digital contents generating apparatus and a digital contents reproducing apparatus, the digital contents generating apparatus and the digital contents reproducing apparatus being inter-connected via a communication network. The digital contents generating apparatus comprises means for embedding electronic watermark data in digital contents and encrypting the digital contents. The digital contents reproducing apparatus comprises a detection unit for the detection of the electronic watermark data from the encrypted digital contents embedded with electronic watermark data, and a decryption unit for the decryption of the encrypted digital contents by means of a predetermined decryption key.

DESCRIPTION OF THE PREFERRED EMBODIMENTS

At first, an example of the technique for the embedding and detection of the electronic watermark data will be described for reference. This is not, however, to be taken as limiting the present invention, for the present invention can be realized by using other techniques for the embedding and detection of the electronic watermark data.

As an example of the technique for the embedding of the electronic watermark data, a first method is proposed (Nikkei Electronics, Apr. 22, 1996, No. 660, p.13). According to this method, an image is frequency-converted, and electronic watermark data are embedded in regions of strong frequency components of a frequency-converted video signal. Since in this first method, the electronic watermark data are embedded in the strong frequency-component regions, the electronic watermark data will not be lost even after the image is processed for compression, expansion, filtering, etc. The electronic watermark data cannot be removed without destroying the original image. Furthermore, in this first method, interference between electronic watermark data is prevented by adopting normally distributed random numbers as the electronic watermark data. And the electronic watermark data are embedded to prevent deterioration in image quality.

Specifically, in this first method for the embedding of the electronic watermark data, the original image is transformed into frequency components by means of a discreet cosine transform (hereunder referred to as DCT), for example, and a number n of data $f(1), f(2), \ldots, f(n)$ are selected that show high values in the frequency domain. On the other hand, electronic watermark data $w(1), w(2), \ldots, w(n)$ are chosen from a normal distribution with a mean 0 and variance 1, and $F(i)$ is computed with respect to each i according to $$F(i)=f(i)+\alpha \times |f(i)| \times w(i)$$

where $\alpha$ is a scaling factor.

Then, the inverse DCT of $F(i)$ is computed to obtain an electronic watermark data-embedded image.

The detection of the electronic watermark data is performed by the following method. In this method, the original image $f(i)$ and electronic watermark data candidates $w(i)$ ($i=1, 2, \ldots, n$) must be known.

First, the digital contents embedded with electronic watermark data are transformed into frequency components by e.g. DCT, and values of factors corresponding to $f(1)$, $f(2), \ldots, f(n)$ in which the electronic watermark data are embedded are designated as $F(1), F(2), \ldots, F(n)$. Using $f(i)$ and $F(i)$, the electronic watermark data $W(i)$ are extracted according to $$W(i)=\{F(i)-f(i)\}/f(i).$$

Thereafter, statistical similarity C between w(i) and W(i) is computed by using the inner product of vectors, according to $$C=W \cdot w/(WD \times wD)$$

wherein $W=(W(1), W(2), \ldots, W(n))$, $w=(w(1), w(2), \ldots, w(n))$, WD=absolute value of vector W, wD=absolute value of vector w, and $\cdot$ is the inner product of the vectors.

When the statistical similarity C is a certain value or more, it is determined that the electronic watermark data are embedded.

By thus having the electronic watermark data embedded in the image by the first method, an author who owns the original image can effectively perform a detection procedure on digital image data suspected of being an illegal copy. The first method allows the author who owns the original image to detect the electronic watermark data when performing the detection procedure on the digital image data suspected of being an illegal copy. However, the first method requires the original image, and so the detection of the electronic watermark data cannot be performed in a reproducing apparatus at terminals of those other than the author because of the absence of the original image.

In view of this problem, a second method is proposed which is based on an improvement of the first method. In the second method, the original image is divided into blocks of 8×8 pixels. The embedding of the electronic watermark data and the detection procedure are performed on a block-by-block basis.

During the electronic watermark data-embedding process, AC components in the frequency domain after DCT are first designated as $f(1), f(2), \ldots, f(n)$ in increasing order of frequency components. Then, electronic watermark data $w(1), w(2), \ldots, w(n)$ are chosen from a normal distribution with a mean 0 and variance 1, and $F(i)$ is computed according to $$F(i)=f(i)+\alpha \times avg\{f(i)\} \times w(i)$$

wherein $\alpha$ is a scaling factor and $avg\{f(i)\}$ is a partial average obtained by averaging three absolute values at points near $f(i)$.

The electronic watermark data are detected by the following detection method. In this method, the original image is not needed, and it is only necessary that electronic watermark data candidates $w(i)$ ($i=1, 2, \ldots, n$) are known.

By performing the inverse DCT on $F(i)$, the electronic watermark data-embedded image can be obtained.

Thereafter, DCT is performed on the electronic watermark data-embedded image, and the frequency components in the frequency domain are designated as $F(1), F(2), \ldots, F(n)$ in increasing order of frequency components for the block. An average value of three absolute values at points $F(i-1), F(i)$ and $F(i+1)$ near $F(i)$ are designated as a partial average $avg(F(i))$. The electronic watermark data $W(i)$ are then computed according to $$W(i)=F(i)/avg\{F(i)\}.$$

Further, a total sum $WF(i)$ of $W(i)$ for a single image is computed with respect to each i.

Then, statistical similarity C between w(i) and WF(i) is computed based on the inner product of vectors according to $$C=WF \cdot w/(WFD \times wD).$$

When the statistical similarity C is a certain value or more, it is determined that the electronic watermark data are embedded.

Figure 1:
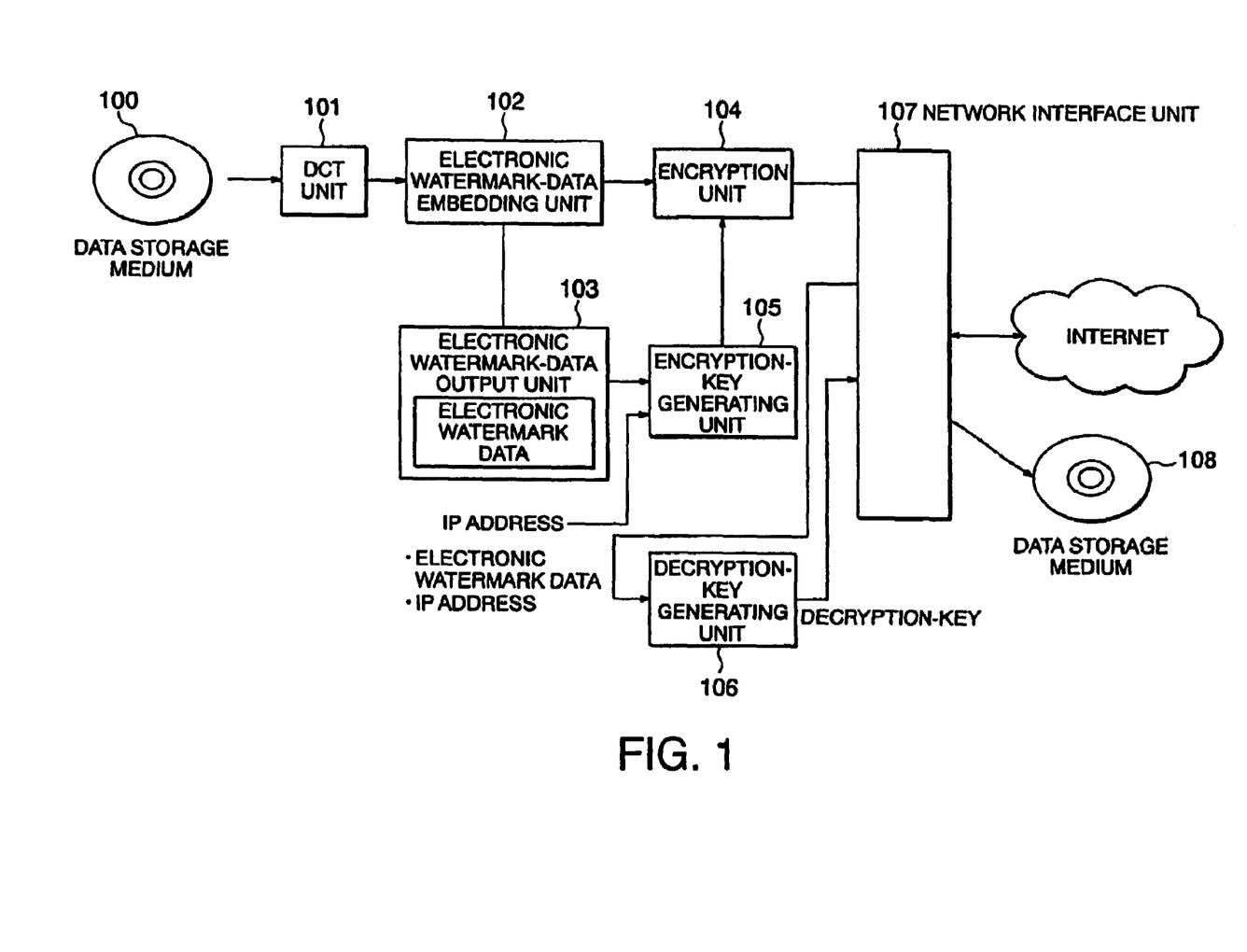
FIG. 1 is a block diagram of the structure of a digital contents generating apparatus according to the present invention.

Referring to FIG. 1, a preferred embodiment of a digital contents generating apparatus according to the present invention will be described. The digital contents generating apparatus is used for the embedding of electronic watermark data in digital contents provided via a data storage medium and the encryption of the digital contents in which the electronic watermark data has been embedded. The data storage medium refers to a multimedia-data compatible recording medium, such as a disc recording medium including a DVD and a CD-ROM, and a semiconductor chip medium. The digital contents refer to multimedia data including still images, video and audio or combinations thereof.

In FIG. 1, the digital contents generating apparatus comprises a discreet cosine transform (hereinafter referred to as DCT) unit 101, an electronic watermark-data output unit 103 in which electronic watermark data are stored and an electronic watermark-data embedding unit 102. The digital contents generating apparatus also comprises an encryption unit 104, an encryption-key generating unit 105 for the generation of an encryption key, a decryption-key generating unit 106 for the generation of a decryption key, and a network interface unit 107 for connection with the Internet.

The above-mentioned individual components are realized by an information processing device and a storage device which are mounted on a personal computer, a workstation or other computer systems. The information processing device comprises an internal memory for the storage of data, a signal input port and a signal output port, and performs a procedure according to a control program. The signal input port may be of any type as long as it is adapted for digital contents input. Likewise, the signal output port may be of any type as long as it is capable of outputting encrypted digital contents containing electronic watermark data. The control program is provided as stored in a storage medium such as a magnetic disk or a semiconductor memory, and loaded into the information processing device. The type of the storage medium is not particularly limited as long as it is capable of being read by the information processing device.

In this structure, the DCT unit 101 performs the DCT on digital contents such as an image stored in a data storage medium 100, and outputs a frequency component signal to the electronic watermark-data embedding unit 102. The electronic watermark-data output unit 103 has predetermined electronic watermark data stored in advance. The electronic watermark-data embedding unit 102 receives the frequency component signal from the DCT unit 101 and the electronic watermark data output from the electronic watermark-data output unit 103. The electronic watermark-data embedding unit 102 then embeds the electronic watermark data in the frequency component signal. The encryption-key generating unit 105 generates the encryption key on the basis of an IP address of a user to whom the digital contents are to be transmitted (destination IP address) and the embedded electronic watermark data.

The algorithm for the generation of the encryption key K is generally expressed by $$K = F(W, A)$$

wherein F is a predetermined function, W is the electronic watermark data and A is the IP address.

However, the encryption key generating algorithm is not limited to the above expression.

The encryption unit 104 receives the encryption key generated by the encryption-key generating unit 105 and encrypts the output data from the electronic watermark-data embedding unit 102 by using the encryption key. It should be noted, however, that a certain amount of data located at the head of the output data from the electronic watermark-data embedding unit 102 is not encrypted. This is to allow the detection of the electronic watermark data in the digital contents reproducing apparatus, as will be described later.

The encryption algorithm may be a known, general algorithm.

The network interface unit 107 sends the encrypted digital contents output from the encryption unit 104 to the user via the Internet or the data storage medium 108. The decryption-key generating unit 106 will be described later.

Now referring to FIG. 2, a preferred embodiment of the digital contents reproducing apparatus according to the present invention will be described. The digital contents reproducing apparatus extracts the electronic watermark data from the encrypted digital contents provided via the Internet. The digital contents reproducing apparatus also decrypts the encrypted digital contents by means of a predetermined decryption key, and then displays the decrypted data on a display and the like.

Figure 2:
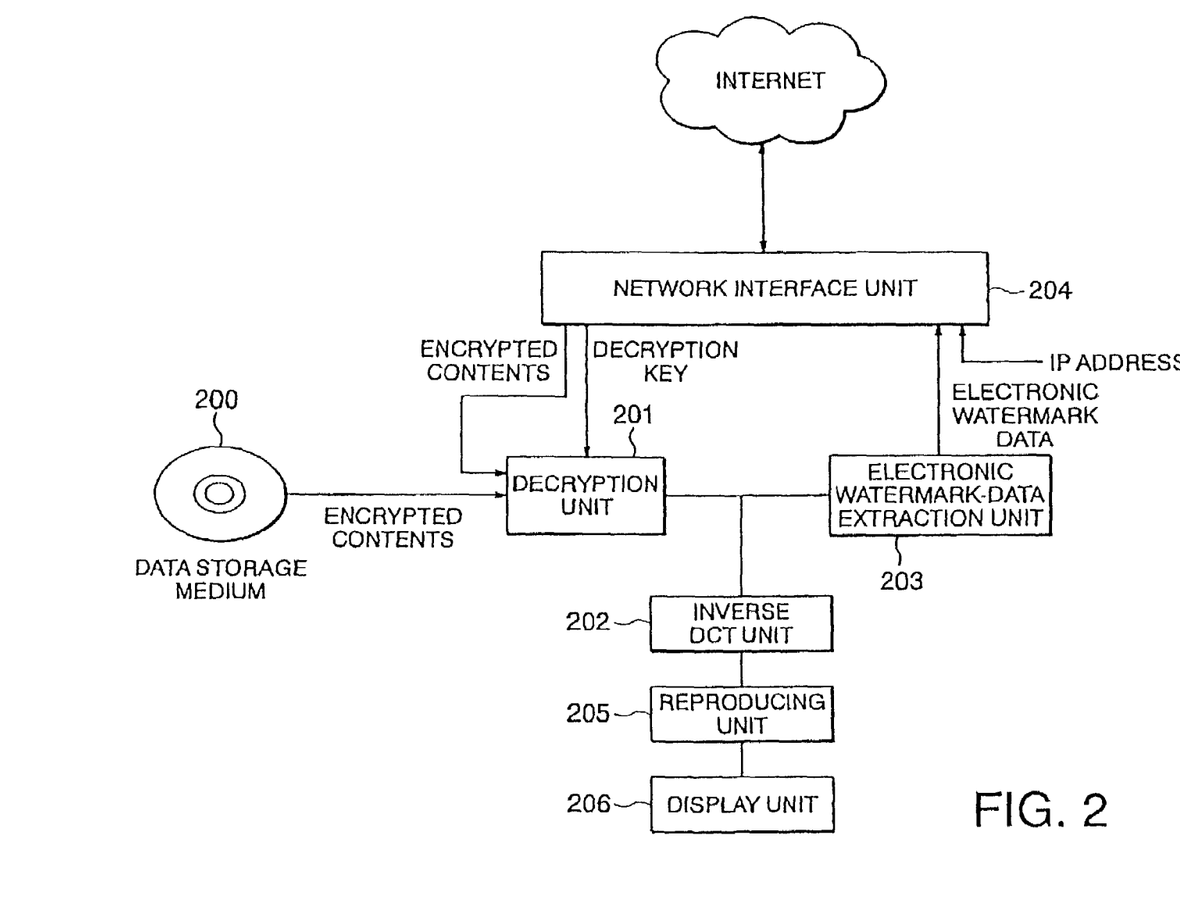
FIG. 2 is a block diagram of the structure of a digital contents reproducing apparatus according to the present invention.

In FIG. 2, the digital contents reproducing apparatus comprises a decryption unit 201 for the decryption of the encrypted digital contents by means of the predetermined decryption key. The digital contents reproducing apparatus also comprises an inverse DCT unit 202, an electronic watermark data extraction unit 203, a network interface unit 204, a reproducing unit 205 and a display unit 206. The digital contents reproducing apparatus is connected to the Internet via the network interface unit 204. Further, a WWW browser is installed in the digital contents reproducing apparatus in an operable manner.

The above-mentioned individual components are realized by an information processing device, a storage device and a display device such as a CRT which are mounted on a personal computer, a workstation or other computer systems. The information processing device comprises an internal memory for the storage of data, a signal input port and a signal output port, and carries out a procedure according to a control program. The signal input port may be of any type adapted for the input of encrypted digital contents containing electronic watermark data. Likewise, the signal output port may be of any type capable of outputting digital contents and extracted electronic watermark data. The control program is provided as stored in a magnetic disk or a semiconductor memory or other storage medium, and loaded into the information processing device. The storage medium is not particularly limited and may be of any type capable of being read by the information processing device.

In this structure, the decryption unit 201 decrypts the encrypted digital contents containing electronic watermark data (e.g. data in an MPEG stream format) received from the Internet or a data storage medium 200. The decrypted digital contents are output to the electronic watermark data extraction unit 203 and the inverse DCT unit 202. The electronic watermark data-containing digital contents comprise data in an MPEG stream format, for example. As mentioned above, a certain amount of data located at the head of the electronic watermark data-containing digital contents is not encrypted. This allows the electronic watermark data extraction unit 203 to extract the electronic watermark data. The electronic watermark data extraction unit 203 outputs the extracted electronic watermark data to the network interface unit 204. The network interface unit 204 sends out its own IP address and the electronic watermark data to the digital contents generating apparatus via the Internet.

Again, referring to FIG. 1, the decryption-key generating unit 106 receives via the Internet the electronic watermark data and IP address output by the digital contents reproducing apparatus, and generates a decryption key. The decryption key is used for the decryption of the encrypted digital contents being received by the above-mentioned digital contents reproducing apparatus.

The algorithm for the generation of the decryption key k is generally expressed by $$k = f(W, A)$$

wherein f is a predetermined function, W is electronic watermark data and A is an IP address.

The decryption-key generating algorithm, however, is not particularly limited to the above expression. It should also be noted that in the private key cryptography, the same key is used for both encryption and decryption. Thus, the functions F and f are identical in the case of the private key cryptography.

The thus generated decryption key is transmitted to the digital contents reproducing apparatus via the network interface unit 107 and the Internet.

Now referring back to FIG. 2, the decryption unit 201 receives the decryption key from the network interface unit 204. Using the decryption key, the decryption unit 201 decrypts the encrypted digital contents, and sends decrypted digital contents to the inverse DCT unit 202. The inverse DCT unit 202 performs the inverse DCT on the decrypted digital contents and outputs the result to the reproducing unit 205. The reproducing unit 205 reproduces the digital contents from the input data and outputs it to the display unit 206, which displays the reproduced digital contents.

Figure 3:
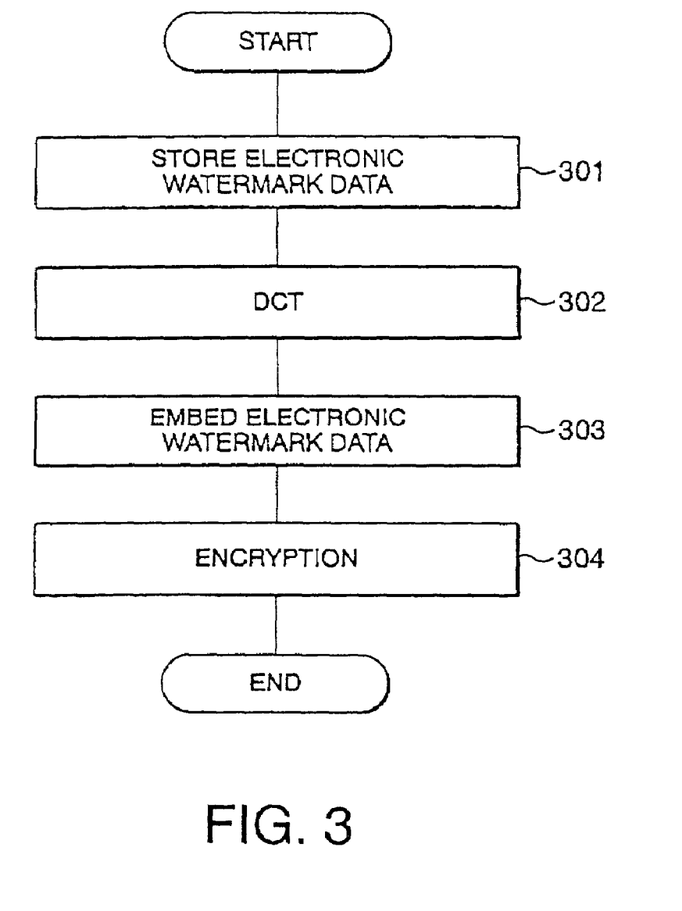
FIG. 3 is a flowchart for the explanation of a digital contents generating method according to the present invention.

Referring to FIG. 3, the operation of the digital contents generating apparatus will be described. When the digital contents generating apparatus according to the present embodiment is realized on a computer system as mentioned above, the control program for controlling the information processing unit comprises instructions for having the information processing device carry out at least those steps described below. The control program causes the information processing device to embed the electronic watermark data in the digital contents input via the signal input port and then to encrypt the contents.

First, predetermined electronic watermark data are stored in the electronic watermark-data output unit 103 (step 301). After digital contents has been input to the signal input port, the DCT unit 101 performs a DCT on the input digital contents (step 302). The electronic watermark-data embedding unit 102 then embeds the electronic watermark data received from the electronic watermark-data output unit 103 in the data obtained as a result of the spectrum transformation in the DCT unit 101 (step 303). Finally, the encryption unit 104 encrypts the output data from the electronic watermark-data embedding unit 102, using the encryption key generated by the encryption-key generating unit 105 on the basis of the electronic watermark data and IP address (step 304).

On the other hand, apart from the above procedure, the decryption-key generating unit 106 generates a decryption key on the basis of the electronic watermark data and IP address transmitted from the digital contents reproducing apparatus, and sends out the generated decryption key to the digital contents reproducing apparatus.

Figure 4A:
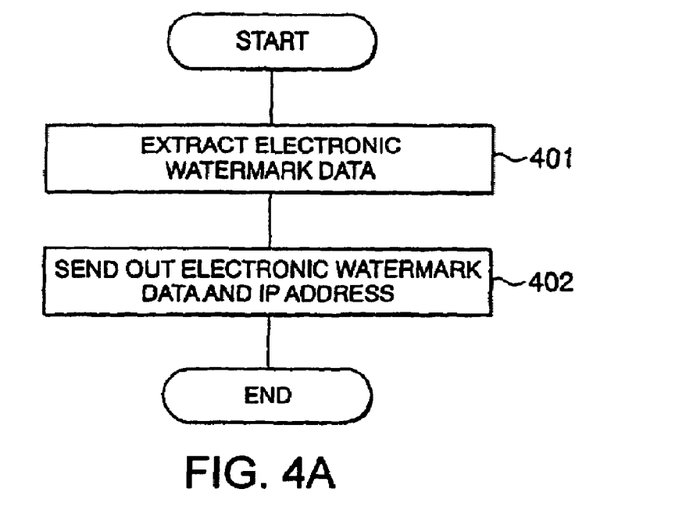
FIGS. 4A and 4B are flowcharts for the explanation of a digital contents reproducing method according to the present invention.
Figure 4B:
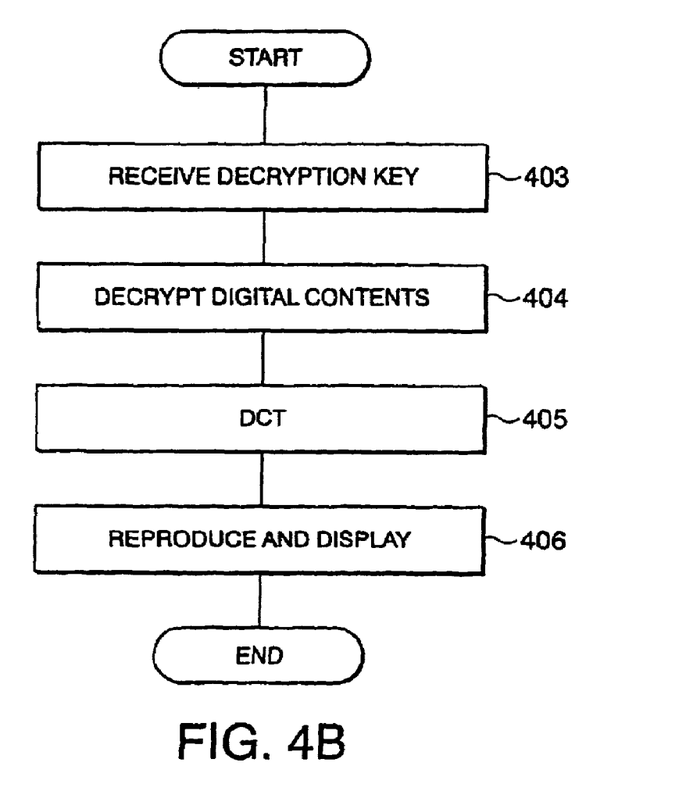

Now referring to FIG. 4, the operation of the digital contents reproducing apparatus will be described. When the digital contents reproducing apparatus according to the present embodiment is realized on a computer system as mentioned above, the control program for controlling the information processing device includes instructions for having the information processing device carry out at least the steps described below. The control program causes the information processing device to perform a procedure for decrypting the encrypted digital contents embedded with electronic watermark data received via the signal input port.

First, the electronic watermark data extraction unit 203 extracts the electronic watermark data from predetermined data which are not encrypted within the input digital contents (step 401). The electronic watermark data extraction unit 203 then sends out the extracted electronic watermark data and the IP address to the digital contents generating apparatus (step 402). On the other hand, the decryption unit 201 receives the decryption key from the digital contents generating apparatus (step 403), and decrypts the digital contents, using the received decryption key (step 404). Then, the inverse DCT unit 202 performs an inverse DCT on the decrypted data (step 405). Finally, the reproducing unit 205 reproduces the decrypted digital contents, which are then displayed by the display unit 206 (step 406).

Figure 5:
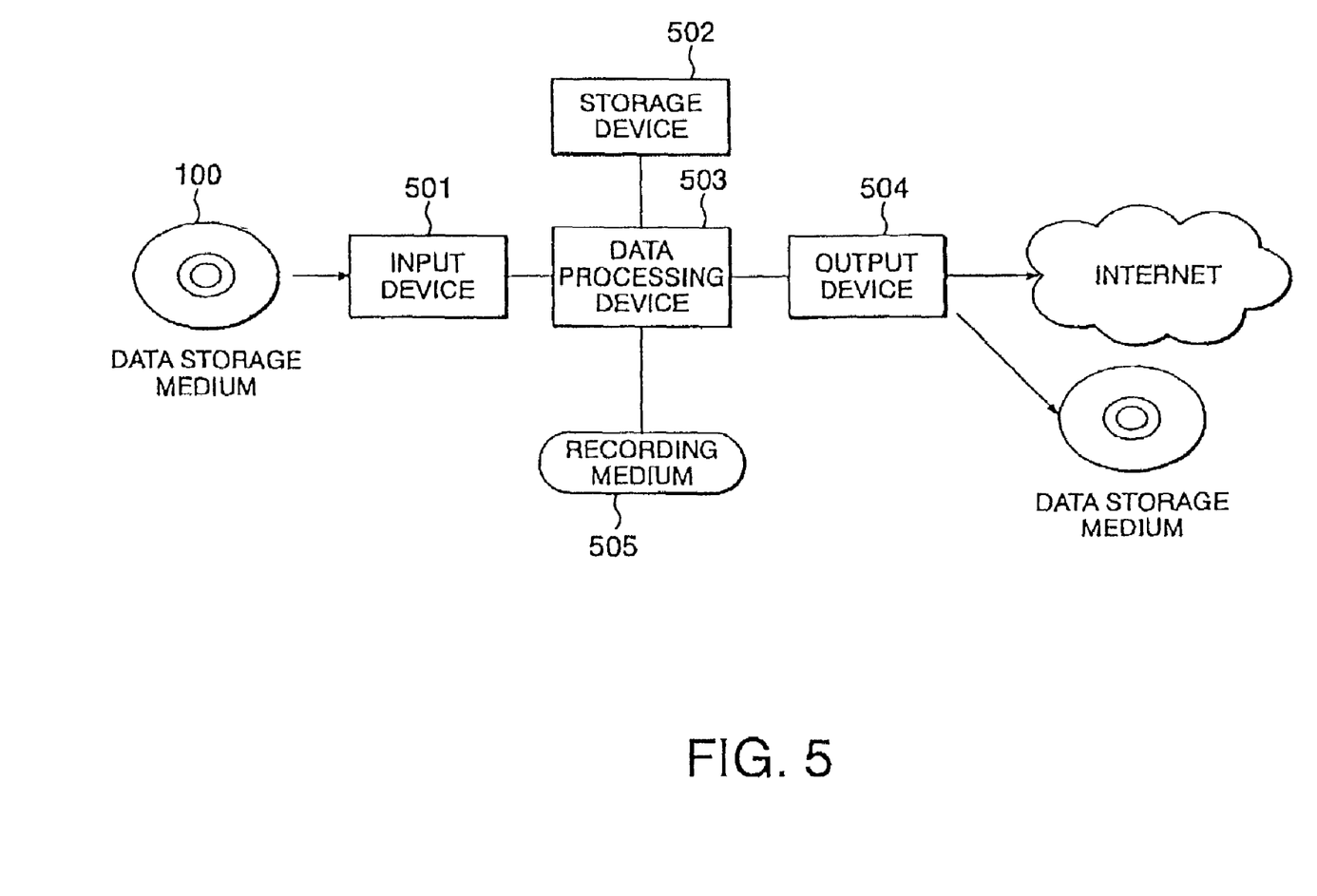
FIG. 5 is a block diagram for the explanation of the operation of a recording medium according to the present invention which is used in the digital contents generating apparatus shown in FIG. 1.

An embodiment of the recording medium applied in the digital contents generating apparatus according to the present invention will be described by referring to FIG. 5. As shown, the embodiment comprises a recording medium 505 in which a program was recorded. The program is for carrying out steps for the embedding of the electronic watermark data, the generation of the encryption key, encryption and the generation of the decryption key. The recording medium 505 is realized by a magnetic disk, a semiconductor memory and the like. The program is stored from the recording medium 505 to the memory device 502. The data processing device 503, under the control of the program, performs the same procedure as does the aforementioned embodiment. Namely, an input device 501 receives digital contents from the data storage medium 100 and then outputs the contents to the data processing device 503. The data processing device 503 embeds electronic watermark data in the digital contents, encrypts it and outputs the encrypted digital contents with the embedded electronic watermark data to an output device 504. The output device 504 outputs the encrypted digital contents to the Internet. The data processing device 503 also generates a decryption key on the basis of the electronic watermark data and IP address received from the digital contents reproducing apparatus.

Figure 6:
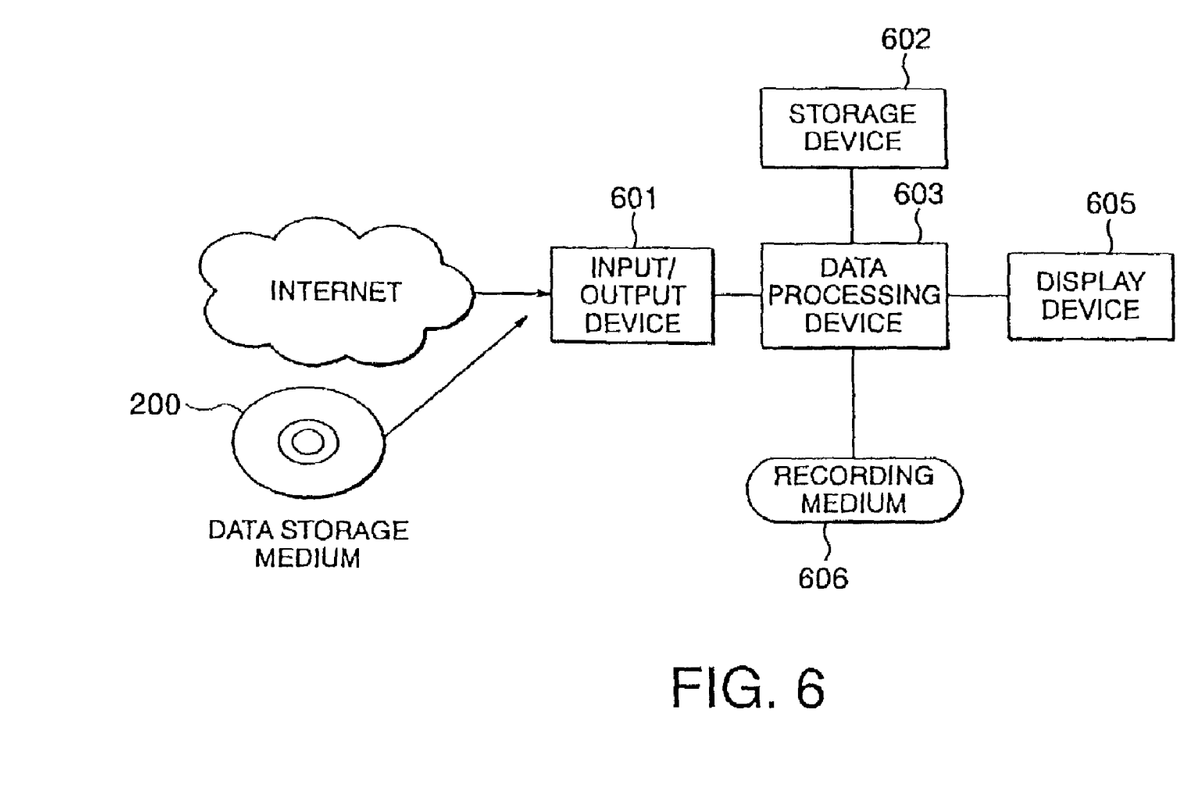
FIG. 6 is a block diagram for the explanation of the operation of a recording medium according to the present invention which is used in the digital contents reproducing apparatus shown in FIG. 2.

Now referring to FIG. 6, an embodiment of a recording medium applied in the digital contents reproducing apparatus according to the present invention will be described. In FIG. 6, the embodiment comprises a recording medium 606 in which a program was recorded for the execution of procedures for electronic watermark data extraction and decryption. The recording medium 606 is realized by a magnetic disk, a semiconductor memory and the like. The program is stored from the recording medium 606 to a memory device 602. A data processing device 603, under the control of the program, performs the same procedure as does the aforementioned embodiment. The data processing device 603 also performs a procedure for the reproducing of the digital contents.

Specifically, an input/output device 601 receives the encrypted digital contents from the Internet or the data storage medium 200, and then outputs the contents to the data processing device 603. The data processing device 603, under the control of the program stored in the memory device 602, extracts the electronic watermark data from the digital contents and outputs it, together with the IP address, to the input/output device 601. The input/output device 601 sends out the electronic watermark data and the IP address to the Internet. The input/output device 601 also receives the decryption key via the Internet and sends the decryption key to the data processing device 603. Using the received decryption key, the data processing device 603 performs a decryption procedure on the encrypted digital contents. The decrypted digital contents are displayed by a display device 605.

Figure 7:
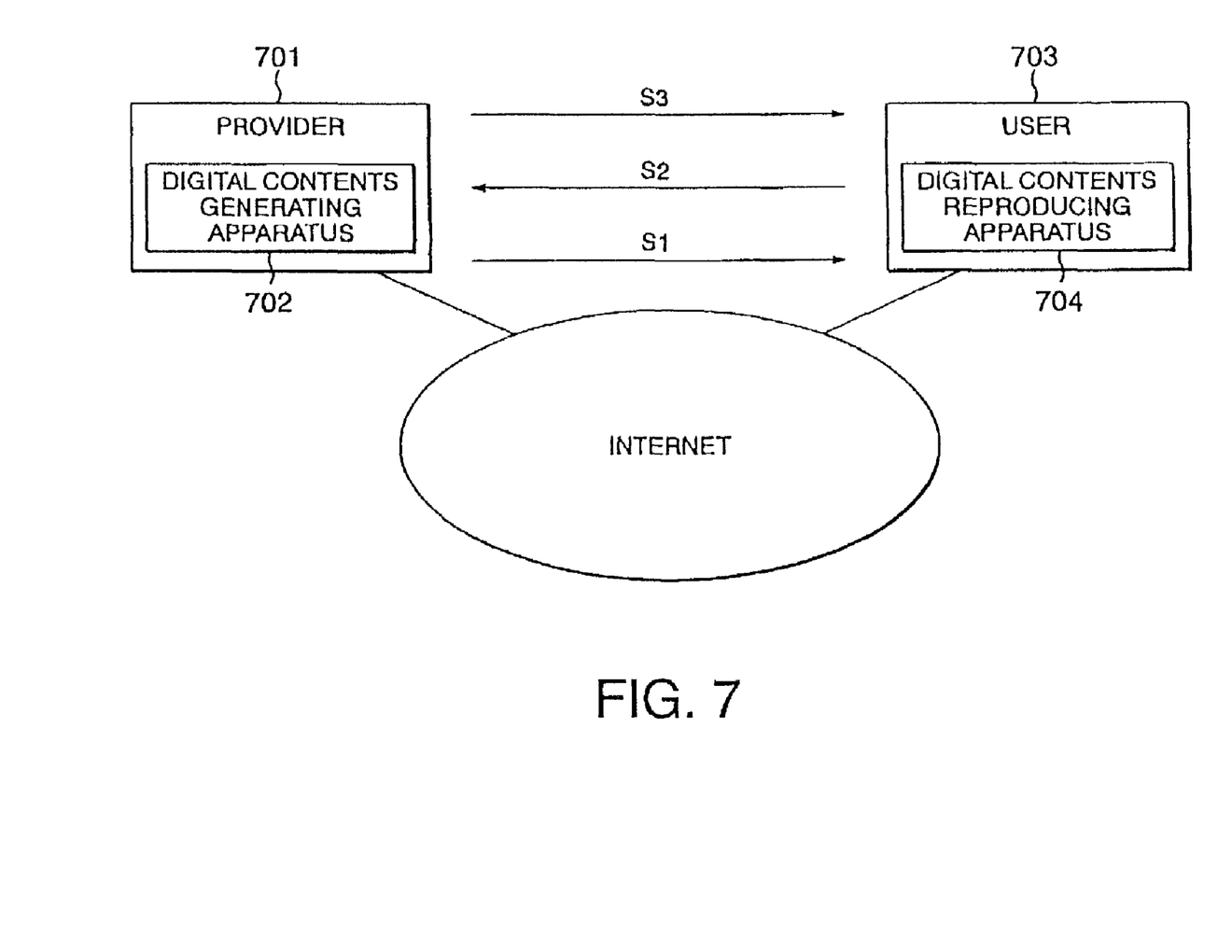
FIG. 7 is a block diagram of the structure of a digital contents providing system according to the present invention.

Now referring to FIG. 7, an embodiment of a digital contents providing system according to the present invention will be described. The digital contents providing system comprises a digital contents generating apparatus 702 owned by a provider 701 and a digital contents reproducing apparatus 704 owned by a user 703. The digital contents generating apparatus 702 embeds electronic watermark data in digital contents and then encrypts the digital contents. The digital contents reproducing apparatus 704 reproduces the digital contents.

Specifically, the digital contents generating apparatus 702 embeds electronic watermark data in digital contents such as a still image or video, performs an encryption process on the digital contents and provides the encrypted digital contents to the user. The specific structure of the digital contents generating apparatus 702 is the same as in the embodiment described above.

The digital contents reproducing apparatus 704 reproduces the electronic watermark data-containing digital contents and shows it on a display. The specific structure of the digital contents reproducing apparatus 704 is the same as in the embodiment described above.

Hereunder the operation of the digital contents providing system will be described. The provider 701, using the digital contents generating apparatus 702, embeds the electronic watermark data in the digital contents, encrypts it, and sends the encrypted digital contents to the digital contents reproducing apparatus 704 owned by the user via the Internet or the data storage medium (step S1). The digital contents reproducing apparatus 704 extracts the electronic watermark data from the digital contents, and sends the extracted electronic watermark data, together with its own IP address, to the digital contents generating apparatus 702 via the Internet (step S2). Based on the thus transmitted electronic watermark data and IP address, the digital contents generating apparatus 702 generates a decryption key and sends it to the digital contents reproducing apparatus 704 via the Internet (step S3). Using the received decryption key, the digital contents reproducing apparatus 704 decrypts the encrypted digital contents, and reproduces and displays the decrypted digital contents.

Thus, in accordance with the present invention, when digital contents are to be provided using the Internet, electronic watermark data are embedded in the digital contents and then the digital contents embedded with the electronic watermark data are delivered on the Internet in an encrypted form, thereby preventing unauthorized parties from viewing and/or listening to the digital contents.

What is claimed is:

1. A digital contents generating apparatus comprising:
   an electronic watermark-data output unit for outputting predetermined electronic watermark data;
   electronic watermark-data embedding unit for embedding the electronic watermark data output by said electronic watermark-data output unit in digital contents;
   an encryption-key generating unit for generating an encryption key on the basis of said electronic watermark data and a predetermined IP address;
   an encryption unit for encrypting the digital contents embedded with electronic watermark data by means of the generated encryption key and outputting the encrypted digital contents to a communication network; and
   a decryption-key generating unit for generating, on the basis of said electronic watermark data and IP data received from said communication network, a decryption key for the decryption of the encrypted digital contents, and outputting said decryption key to said communication network.

2. A digital contents generating apparatus according to claim 1, wherein said encryption unit stores said encrypted digital contents in a data storage medium.

3. A digital contents generating apparatus comprising:
   a discreet cosine transform unit for generating DCT coefficients by processing digital contents with a discreet cosine transform;
   an electronic watermark-data output unit for outputting predetermined electronic watermark data;
   an electronic watermark-data embedding unit for embedding the electronic watermark data received from said electronic watermark-data output unit in the generated DCT coefficients;
   an encryption-key generating unit for generating an encryption key on the basis of said electronic watermark data and a predetermined IP address;
   an encryption unit for encrypting the digital contents embedded with electronic watermark data by means of the generated encryption key and sending out the encrypted digital contents to a communication network; and
   a decryption-key generating unit for generating, on the basis of the electronic watermark data and IP address received from said communication network, a decryption key for the decryption of said encrypted digital contents, and outputting said decryption key to said communication network.

4. A digital contents generating apparatus according to claim 3, wherein said encryption unit stores said encrypted digital contents in a data storage medium.

5. A digital contents providing system comprising a communication network, a digital contents generating apparatus and a digital contents reproducing apparatus, said digital contents generating apparatus and said digital contents reproducing apparatus being inter-connected via said communication network, said digital contents generating apparatus comprising:
   an electronic watermark-data output unit for outputting predetermined electronic watermark data;
   an electronic watermark-data embedding unit for embedding the electronic watermark data received from said electronic watermark-data output unit in digital contents;
   an encryption-key generating unit for generating an encryption key on the basis of said electronic watermark data and a predetermined IP address;
   an encryption unit for encrypting the digital contents in which said electronic watermark data has been embedded, by means of the generated encryption key; and
   a decryption-key generating unit for generating a decryption key for decrypting, on the basis of said electronic watermark data and said IP address received from said communication network, the encrypted digital contents, and outputting the decrypted digital contents to said communication network;
   said digital contents reproducing apparatus comprising:
   an electronic watermark data extraction unit for receiving said encrypted digital contents from said communication network and extracting said electronic watermark data from said encrypted digital contents;
   a decryption unit for receiving said decryption key from said communication network, and decrypting said encrypted digital contents by means of said decryption key;
   a reproducing unit for reproducing an output of said decryption unit and displaying a reproduced output on a display unit; and
   means for outputting the extracted electronic watermark data and the predetermined IP address to said communication network.

6. A digital contents providing system comprising a communication network, a digital contents generating apparatus and a digital contents reproducing apparatus, said digital contents generating apparatus and said digital contents reproducing apparatus being inter-connected via said communication network, said digital contents generating apparatus comprising:

an electronic watermark-data output unit for outputting predetermined electronic watermark data;

an electronic watermark-data embedding unit for embedding the electronic watermark data received from said electronic watermark-data output unit in digital contents;

an encryption-key generating unit for generating an encryption key on the basis of said electronic watermark data and a predetermined IP address;

an encryption unit for encrypting the digital contents in which said electronic watermark data has been embedded, by means of the generated encryption key, and outputting the encrypted digital contents to a data storage medium; and a decryption-key generating unit for generating, on the basis of said electronic watermark data and IP address received from said communication network, a decryption key for the decryption of the encrypted digital contents, and outputting said decryption key to said communication network;

said digital contents reproducing apparatus comprising:

an electronic watermark data extraction unit for receiving said encrypted digital contents from said data storage medium and extracting said electronic watermark data from said encrypted digital contents;

a decryption unit for receiving said decryption key from said communication network and decrypting said encrypted digital contents by means of said decryption key;

a reproducing unit for reproducing an output of said decryption unit and displaying a reproducing output on a display unit; and means for outputting the extracted electronic watermark data and the predetermined IP address to said communication network.

7. A processor-readable medium incorporating a program of instructions for carrying out steps for embedding electronic watermark data in digital contents by the use of a computer system including a processor and a memory unit, said steps comprising:

generating an encryption key on the basis of said electronic watermark data and a predetermined IP address;

encrypting digital contents embedded with said electronic watermark data, by means of said encryption key and outputting the encrypted digital contents to a communication network; and generating, on the basis of said electronic watermark data and IP address received from said communication network, a decryption key for the decryption of said encrypted digital contents, and outputting said decryption key to said communication network.

8. A processor-readable medium incorporating a program of instructions for carrying out steps for extracting electronic watermark data from digital contents embedded with said electronic watermark data by the use of a computer system including a processor, memory unit and display means and displaying said digital contents by said display means, said steps including:

receiving encrypted digital contents embedded with electronic watermark data from a communication network and extracting said electronic watermark data from the encrypted digital contents;

decrypting said encrypted digital contents by means of a decryption key;

reproducing the decrypted digital contents and outputting a reproduced digital contents to said display means;

outputting said electronic watermark data and a predetermined IP address to said communication network; and receiving said decryption key from said communication network, wherein the received decryption key is based on the predetermined IP address.

* * * * *